United States Patent
Chalfin

(10) Patent No.: US 10,544,569 B2
(45) Date of Patent: Jan. 28, 2020

(54) EXTERNALLY ADJUSTABLE FLOW MANAGEMENT VALVE ASSEMBLY AND SYSTEM

(71) Applicant: Flow Dynamics, LLC, Encinitas, CA (US)

(72) Inventor: Jeffrey Alan Chalfin, Carlsbad, CA (US)

(73) Assignee: Flow Dynamics, LLC, Encinitas, CA (US)

( * ) Notice: Subject to any disclaimer, the term of this patent is extended or adjusted under 35 U.S.C. 154(b) by 0 days.

(21) Appl. No.: 15/496,212

(22) Filed: Apr. 25, 2017

(65) Prior Publication Data

US 2018/0306340 A1    Oct. 25, 2018

(51) Int. Cl.
F16K 17/06  (2006.01)
E03B 7/07  (2006.01)

(52) U.S. Cl.
CPC .............. *E03B 7/072* (2013.01); *F16K 17/06* (2013.01); *F16K 17/065* (2013.01)

(58) Field of Classification Search
CPC ............................. F16K 17/06; F16K 17/065
USPC ......................... 137/524, 530, 540, 542, 543
See application file for complete search history.

(56) References Cited

U.S. PATENT DOCUMENTS

| | | |
|---|---|---|
| 678,565 A | 7/1901 | Herbst |
| 967,514 A | 8/1910 | Groh |
| 1,785,271 A | 12/1930 | Lemex |
| 2,301,276 A | 11/1942 | Gussick |
| 2,594,641 A | 4/1952 | Griffith et al. |
| 2,870,784 A | 1/1959 | Walter |
| 3,255,774 A * | 6/1966 | Gallagher ............... F16K 17/06 137/516.29 |
| 3,405,927 A | 10/1968 | Josef et al. |
| 3,422,840 A | 1/1969 | Bryant et al. |
| 3,434,495 A | 3/1969 | Scaramucci |
| 3,747,629 A | 7/1973 | Bauman |
| 3,938,542 A | 2/1976 | Bolha |
| 4,466,461 A | 8/1984 | Weiss |
| 4,535,808 A | 8/1985 | Johanson et al. |
| 4,757,974 A | 7/1988 | Ward et al. |
| 5,349,984 A | 9/1994 | Weinheimer et al. |
| 5,379,835 A | 1/1995 | Streich |
| 6,866,062 B2 | 3/2005 | Lammers |
| 8,707,981 B2 * | 4/2014 | Edgeworth ........... F16K 15/063 137/270 |
| 8,944,098 B1 | 2/2015 | Bocos et al. |
| 9,404,244 B1 | 8/2016 | Gass et al. |
| 2004/0045607 A1 | 3/2004 | Lammers |

(Continued)

*Primary Examiner* — Marina A Tietjen
*Assistant Examiner* — Paul J Gray
(74) *Attorney, Agent, or Firm* — GrayRobinson, P.A.; Michael J. Colitz, III

(57) ABSTRACT

A system and valve assembly that is adapted to increase the efficiency of an upstream water meter. By way of the valve assembly entrained water bubbles can be removed from a water supply. This, in turn, increases the density of the water running through the water meter. This ensures that the water meter is not inaccurately including entrained air as metered water. The result is more accurate water readings and reduced utility bills. The assembly can be externally adjusted using an adjustment tool so as to increase or decrease the tension on an interior spring which, in turn, increases or decreases the rate at which the interior block oscillates.

8 Claims, 10 Drawing Sheets

(56) References Cited

U.S. PATENT DOCUMENTS

| | | |
|---|---|---|
| 2004/0079418 A1 | 4/2004 | Weis et al. |
| 2007/0039652 A1 | 2/2007 | Staggs |
| 2007/0044848 A1 | 3/2007 | Norman |
| 2009/0007973 A1 | 1/2009 | Benvenuto |
| 2009/0289207 A1 | 11/2009 | Barreda et al. |
| 2012/0118406 A1 | 5/2012 | Edgeworth |
| 2014/0182717 A1 | 7/2014 | Edgeworth |

* cited by examiner

EXTERNALLY ADJUSTABLE FLOW MANAGEMENT VALVE ASSEMBLY AND SYSTEM

BACKGROUND OF THE INVENTION

Field of the Invention

This invention relates to a water valve. More specifically, the present invention relates to a valve assembly and an associated system for increasing water density and improving the accuracy of a water meter.

Description of the Background Art

The use of airflow regulating assembly is known in the art. For example, U.S. Pat. App. 2009/0289207 to Barreda discloses a valve assembly that is adapted to be disposed within a water supply line. The valve assembly is structured to reduce or significantly eliminate the passage of air, separate from water flow, through the meter. The valve body includes a sealing structure which is biased under a predetermined force into sealing relation with an inlet of the interior channel. The predetermined force is sufficient to prevent displacement of the sealing structure out of the sealing relation with the inlet, but insufficient to prevent displacement of the sealing structure when force from a normal water flow is exerted thereon. As a result, any air flow within the water supply line will be compressed or otherwise disbursed and prevented from passing, independently, through the meter, thereby preventing unnecessary charges being made to the metered facility.

Although the device of Barreda is sufficient to achieve its stated objective, it is lacking in many respects. The valve assembly of Barreda is needlessly complex with an excess number of moving parts. Moreover, the number of interconnected moving parts requires the device to be lubricated. This lubrication can result in the contamination of the associated drinking water. The system of Barreda is also problematic solution insomuch as its valve assembly must be installed upstream of the meter assembly. Retrofitting a valve assembly upstream of a water meter poses several logical, legal, and safety related issues. The system of the present invention is aimed at overcoming these and other shortcomings of the Barreda device.

SUMMARY OF THE INVENTION

It is therefore an object of the present invention to provide a system for increasing the density of water running through a meter to thereby increase the accuracy of the meter It is another object of the present invention to compress the air into the water as it is being metered.

A further object of the present invention is to provide a valve assembly for increasing the efficiency of an upstream water meter.

Still yet another object of the present invention is to provide a valve assembly that is constructed from self-lubricating polymers to thereby reduce wear ten-fold and avoid the need for external lubricants.

Yet another object of the present invention is to provide a valve construction that eliminates turbulence within water passing there through.

A further object of the present invention is to provide an improved valve construction with a minimal number of moving parts to thereby increase the life cycle of the valve and eliminate the need for repair and maintenance.

Another object of the present invention is to provide an improved valve construction whose internal spring can be adjusted externally.

Another object of the present invention is to provide an adjustment tool which does not require individual calibration prior to installation.

Another object of the present invention is to provide the ability to fine-tune the valve for optimal performance after installation on the water line.

Another object of the present invention is to provide the ability to adjust to future changes in system pressure or flow.

Another object of the present invention is to provide the ability to make adjustments without the need to hire a professional or turn off the water flow, or remove the device from the system.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

PARTS LIST

10 Assembly
12 Valve Housing
14 Upper Valve Housing
16 Lower Valve Housing
18 Forward Valve Inlet
20 Rearward Valve Outlet
22 Tapered Valve Seat
24 Valve Disc
26 Spring
28 Valve Shaft
30 Shoulder
32 Retainer
34 Outer Housing
36 Threading
38 Outside Face
40 Adjustment Tool
42 Adjustment Bore
44 Grip
46 Proximal End
48 Distal End
50 Curved Prong
52 Extension
54 Housing Valve Inlet
56 Housing Valve Outlet
58 Male-Threaded Head
60 Female-Threaded Head

DETAILED DESCRIPTION OF THE PREFERRED EMBODIMENT

This disclosure relates to an externally adjustable flow management valve assembly. By way of the assembly, entrained water bubbles can be removed from a water supply. This, in turn, increases the density of the water running through the water meter. This ensures that the water meter is not inaccurately including entrained air as metered water. The result is more accurate water readings and reduced utility bills. The various components of the present invention and the manner in which they interrelate will be described in greater detail hereinafter.

Figure 1:
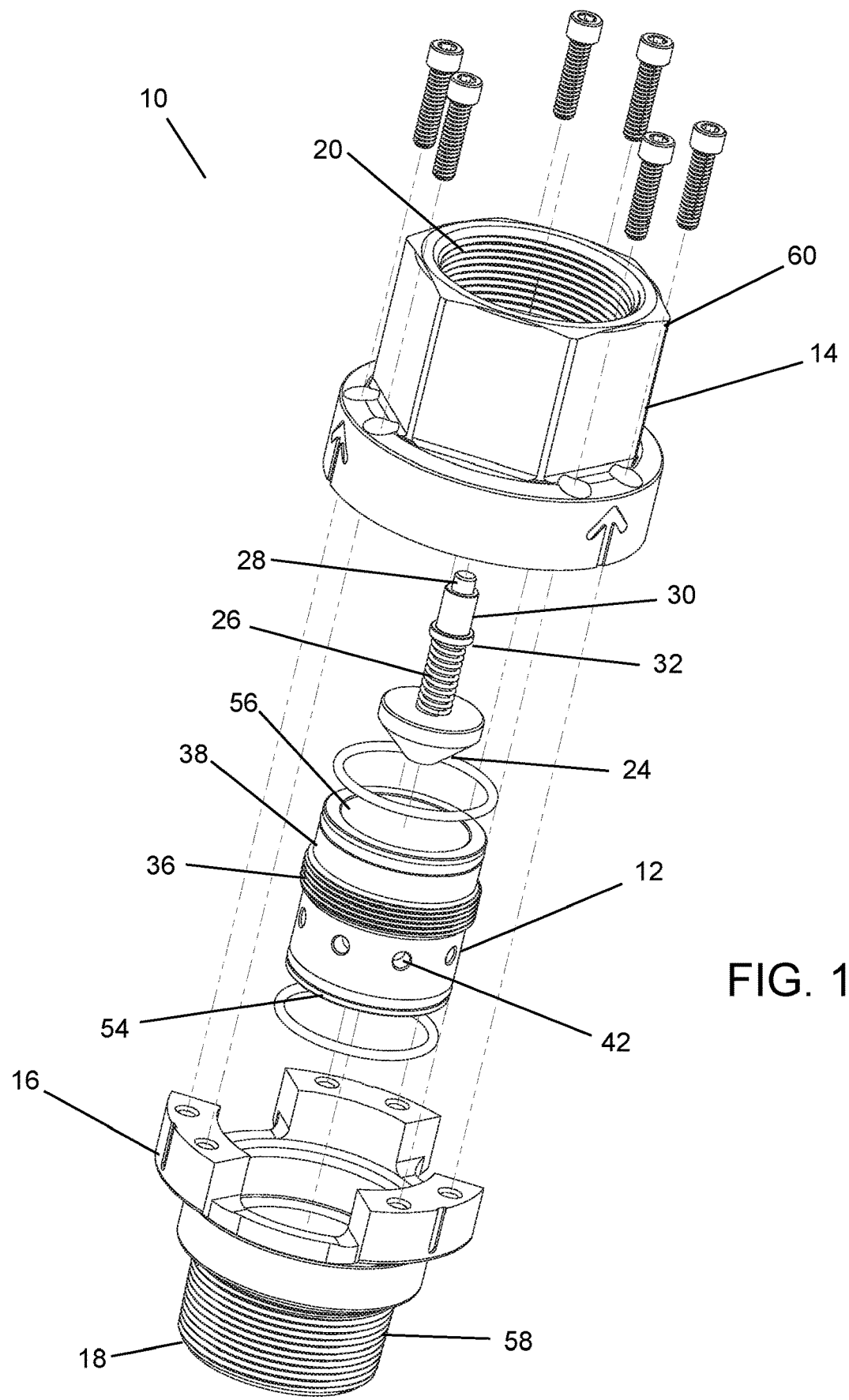
FIG. 1 is a cross-sectional view of the valve assembly of the present invention.

With reference to FIG. 1, the present invention includes an assembly 10 that is positioned downstream of a water meter. The assembly includes a spring biased plunger that is triggered at a predetermined water pressure. This has the effect of driving out any entrained water and increasing the water density as it runs through a water meter. This, in turn, increases the efficiency of the water meter and ensures that the consumer is paying only for the water they use as opposed to water and entrained air. Water meters measure volume; water with air has more volume than water without air given that air has volume. When presented with pressure, the water displaces the air and compacts.

Figure 2:
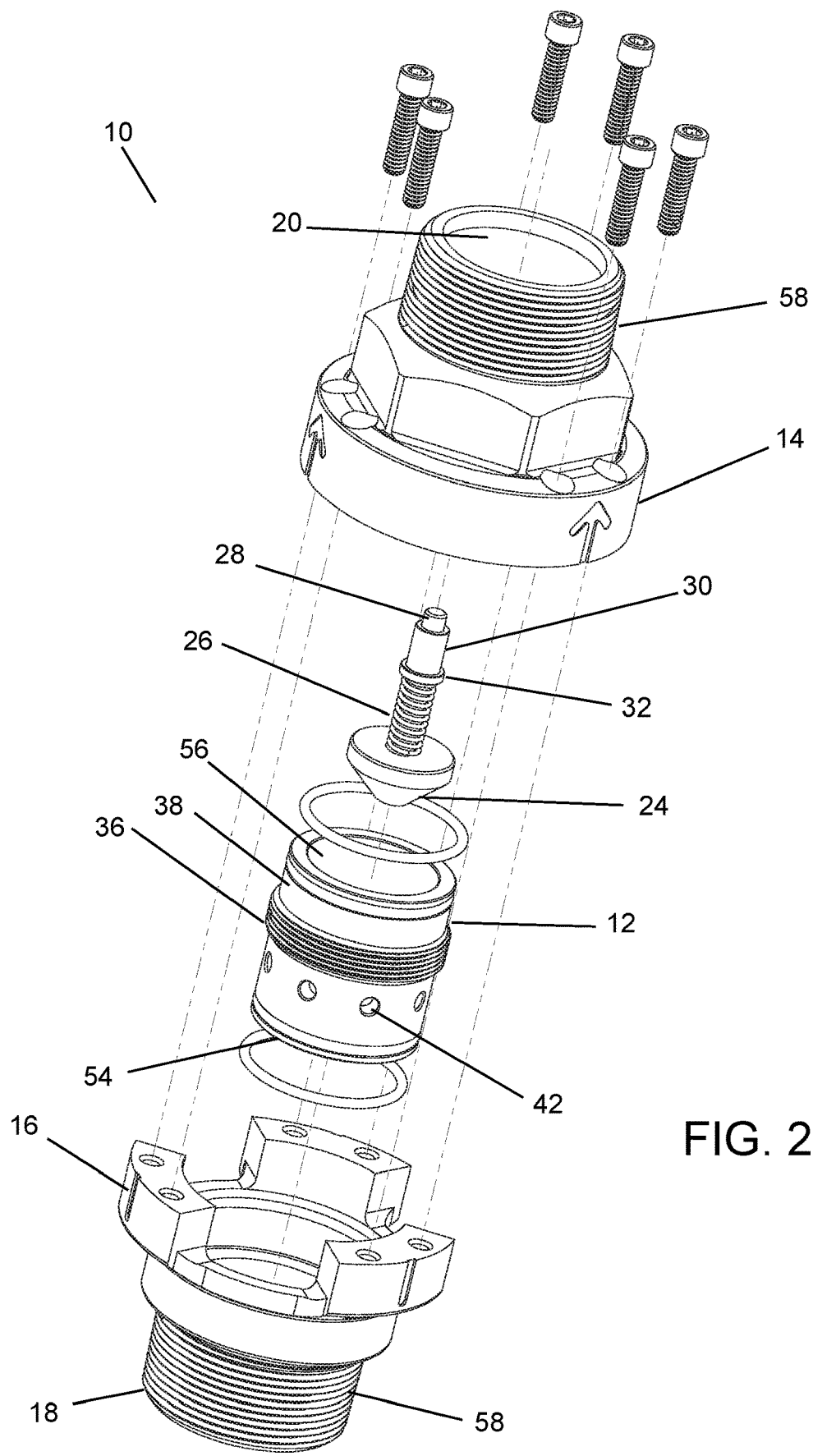
FIG. 2 is a cross-sectional view of the valve assembly of the present invention with an alternative proximal shoulder construction.
Figure 3:
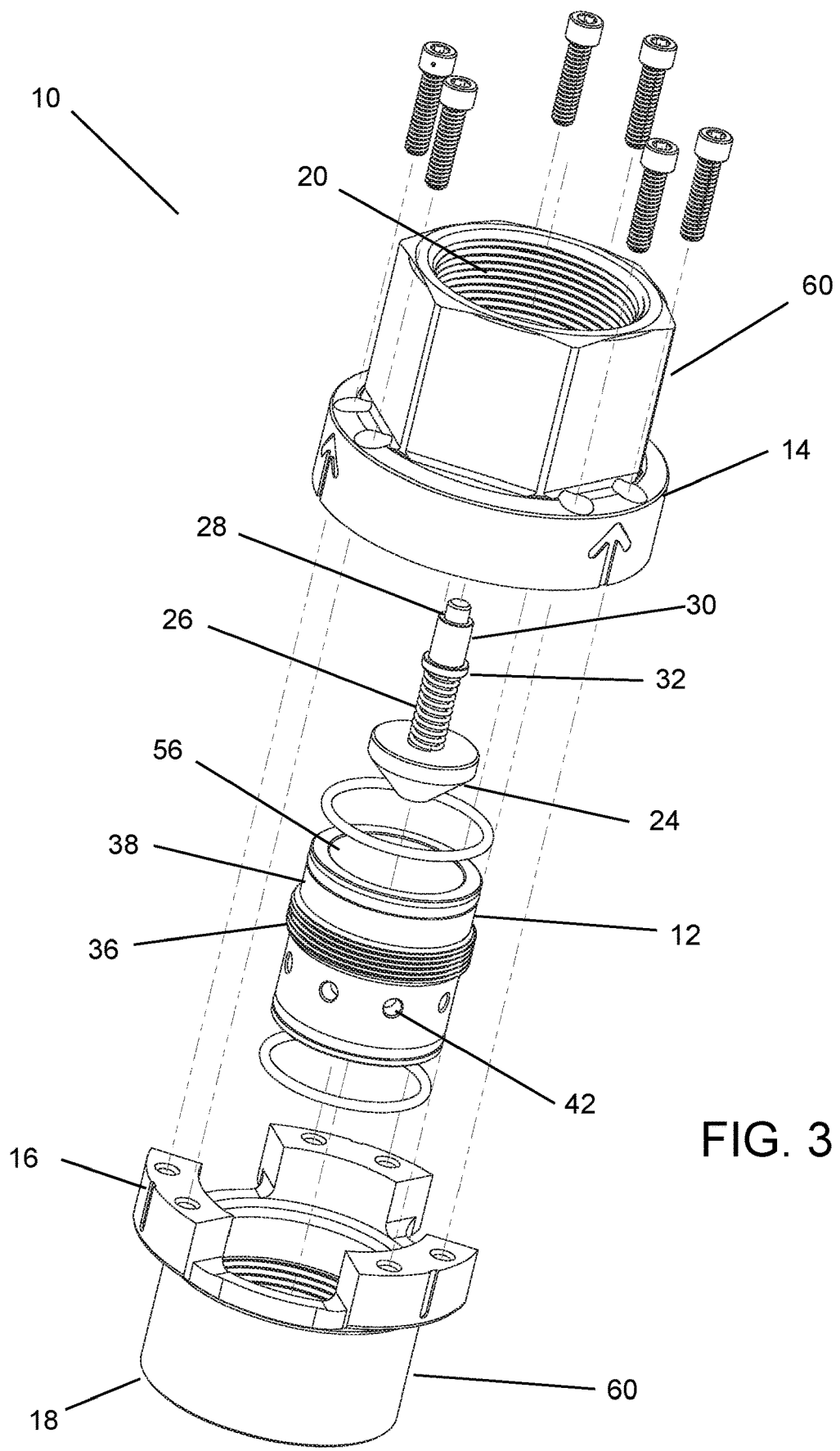
FIG. 3 is a cross-sectional view of the valve assembly of the present invention with an alternative distal shoulder construction.
Figure 4:
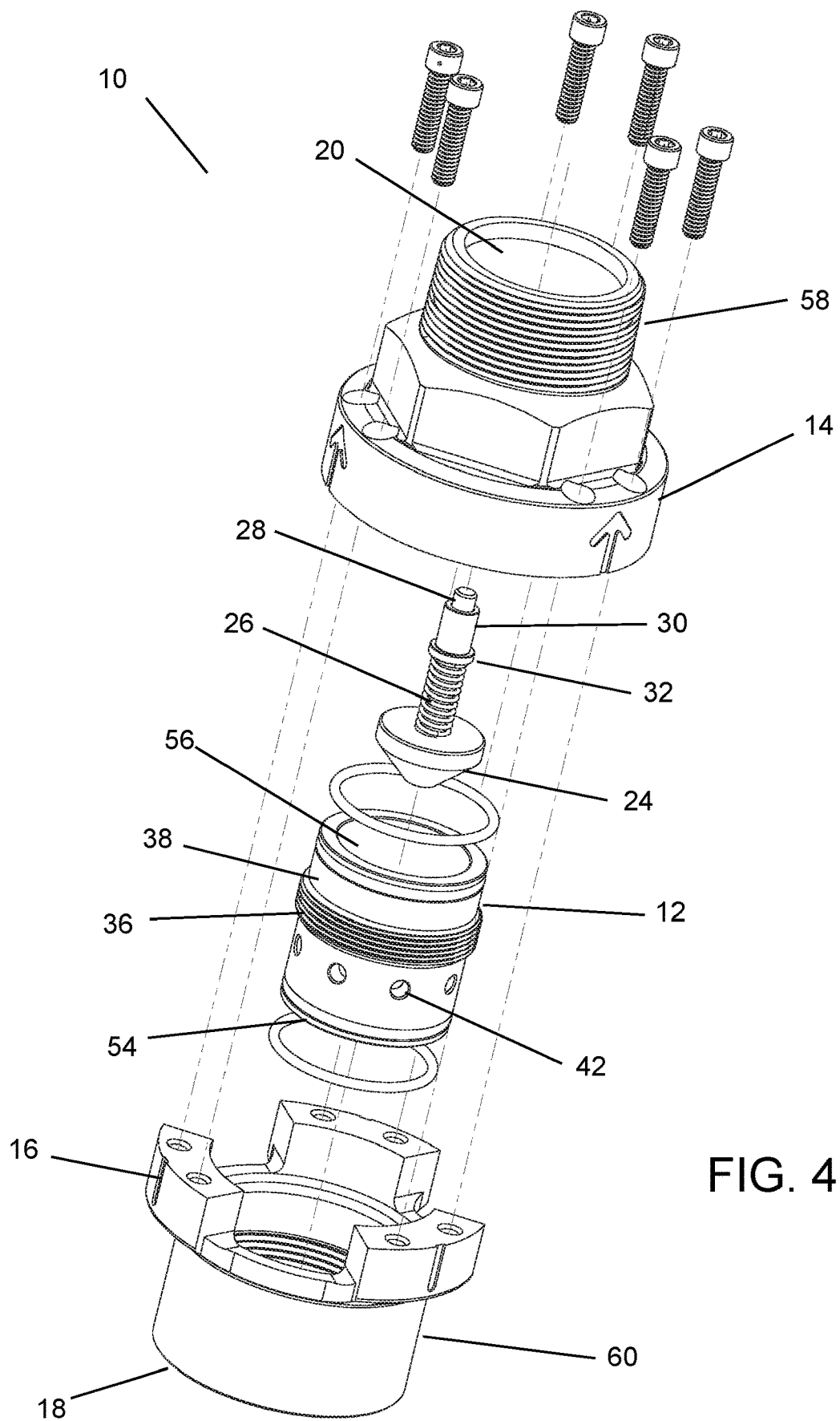
FIG. 4 is a cross-sectional view of the valve assembly of the present invention with an alternative proximal and distal shoulder construction.
Figure 9:
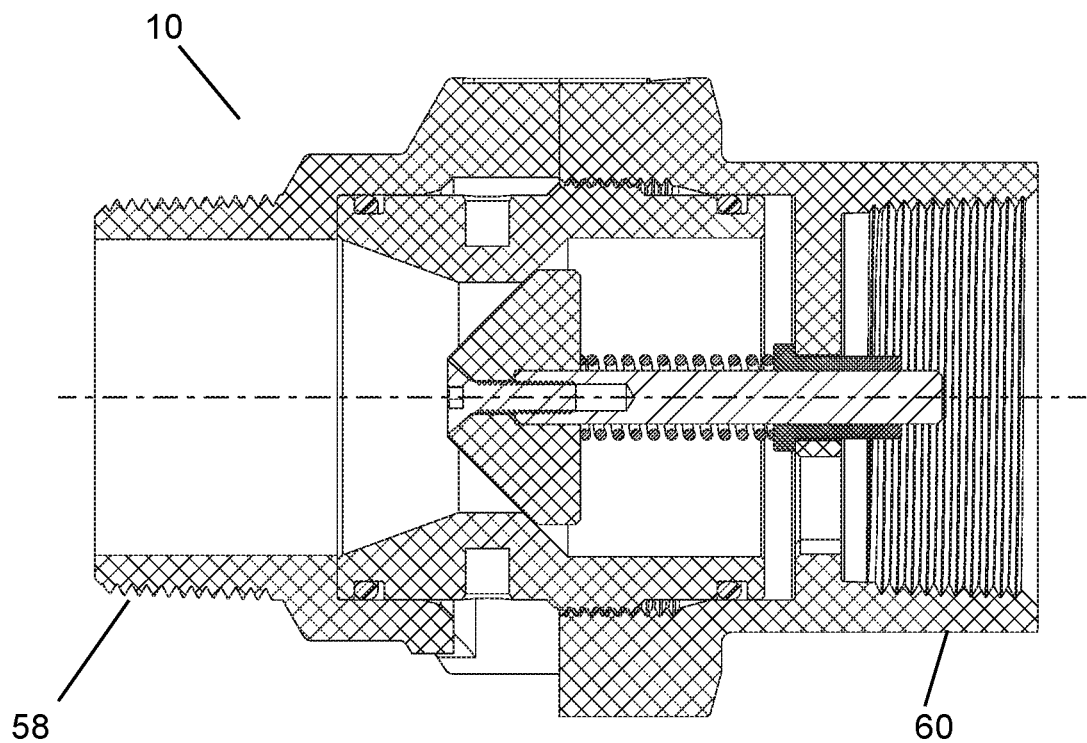
FIG. 9 is a cross-sectional view of the valve assembly wherein the proximal shoulder has a female threaded connection head and the distal shoulder has a male threaded connection head.
Figure 10:
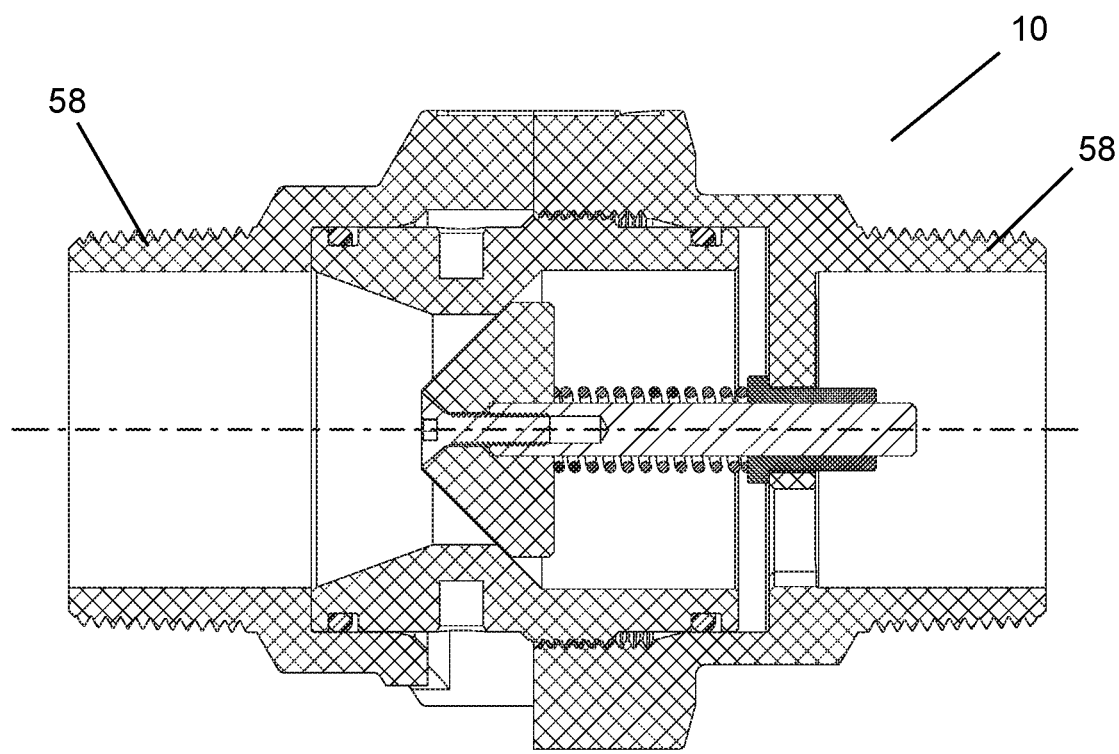
FIG. 10 is a cross-sectional view of the valve assembly wherein the proximal shoulder and the distal shoulder have male threaded connection head.
Figure 11:
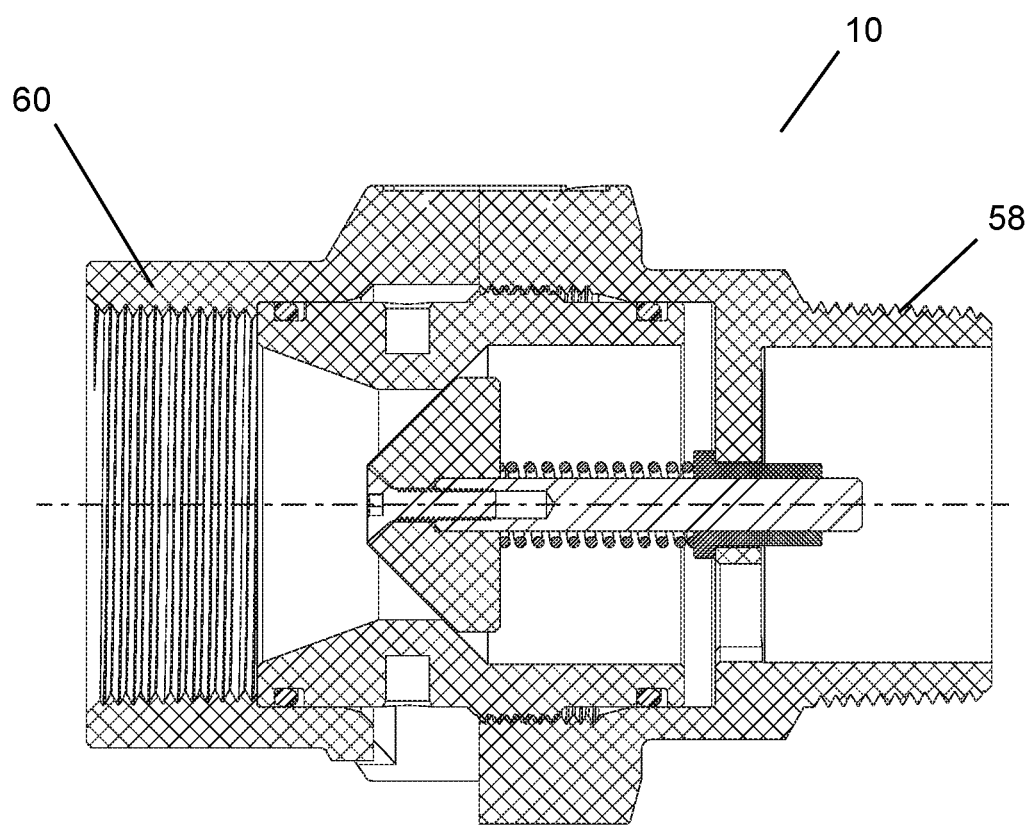
FIG. 11 is a cross-sectional view of the valve assembly wherein the proximal shoulder has a male threaded connection head and the distal shoulder has a female threaded connection head.

As seen in FIGS. 1-4, the assembly 10 comprises a cylindrical valve housing 12 which is nested within an outer housing 34 further comprising an upper housing 14 and lower housing 16. The lower housing 16 has a forward valve inlet 18 and the upper housing 14 has a rearward valve outlet 20. Similarly, the valve housing 12 has a housing valve inlet 54 and housing valve outlet 56. The valve housing 12 is preferably constructed from a self-lubricating polymer such as Acetron GP, Vesconite™, as well as Delrin™. The valve housing 12 further includes a tapered valve seat 22 (also shown in FIG. 7) that is positioned adjacent to forward valve inlet 18. The valve housing 12 has threading 36 on its outside face 38 allowing the valve housing 12 to be rotatable. The valve housing 12 further comprises a series of adjustment bores 42 which, as described below, can be used to rotate the valve housing 12. The upper housing 14 and lower housing 16 may be any type of threaded head. For example, FIG. 1 depicts a female-threaded head 60 for the upper housing 14 and a male-threaded head 58 for the lower housing 16. FIG. 2 depicts a male-male connection type, FIG. 3 depicts a female-female connection type, and FIG. 4 depicts a male-female connection type. FIGS. 9-11 depict cross-sectional views of the assembly 10 with male-female, female-female, and female-male connections; a male-male connection such as in FIG. 2 is also possible but not shown, as are flanged connections. These varying connection types can be of any variety so long as it allows the outer housing 34 to be attached to a water meter/water line.

The assembly 10 can be opened and closed by way of a valve disc 24. Again, this valve disc 24 is preferably formed from a self-lubricating polymer which may be the same polymer used for the cylindrical valve housing 12. The valve disc 24 includes a tapered extent and is generally in the shape of a frustro cone. As illustrated in FIG. 2, the taper of the valve seat 22 approximately matches the taper of the valve disc 24 so that the two can be placed in a fluid tight seal. The use of self-lubricating polymers eliminates the need for any gasket or sealing rings. As such, the valve disc 24 includes a seated orientation where it is in positive and sealing contact with the valve seat 22 to prevent the flow of water therethrough. The valve disc 24 also includes an unseated orientation wherein it is spaced a distance from the valve seat 22. The unseated orientation is generally done against the bias of a spring 26.

With continuing reference to FIGS. 1-4, the valve shaft 28 is depicted. The valve shaft 28 is generally defined with a forward end, a rearward end, and an intermediate extent therebetween. The valve disc 24 includes a centrally located threaded passage. The spring 26 is positioned above the intermediate extent of the valve shaft 28. The spring has a first end which is in contact with a shoulder 30 of the retainer 32 positioned on the rearward end of the valve shaft 28 and a second end which is in contact with the valve disc 24. As such, the spring 26 acts to bias the valve disc 24 into a seated orientation. However, the tension of the spring 26 can be changed by rotating the valve housing 12, described in further detail below.

With this arrangement, water contacting the valve disc 24 will be prevented from flowing through the valve housing 12 unless it exceeds a predetermined threshold pressure as dictated by the spring tension. Once this threshold water pressure is achieved, the valve disc 24 will unseat and water will pass through the valve housing 12. It is envisioned that the water will repetitively exceed and not exceed this threshold water pressure. This will cause the valve disc 24 to repetitively open and close. This, in turn, results in the water upstream from the valve becoming more dense and driving out any entrained air.

Figure 5:
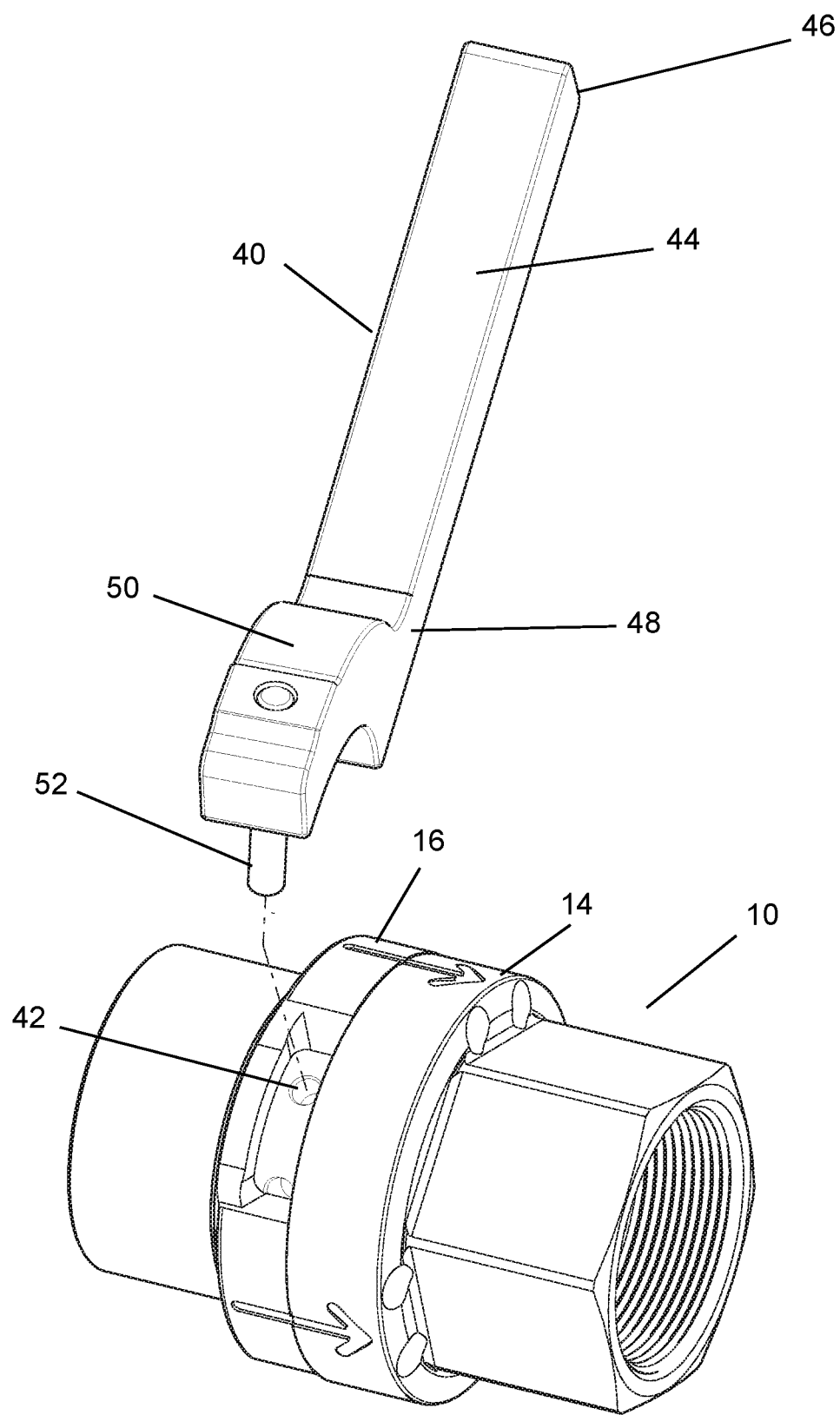
FIG. 5 is a perspective view of the valve assembly and adjustment tool.
Figure 6:
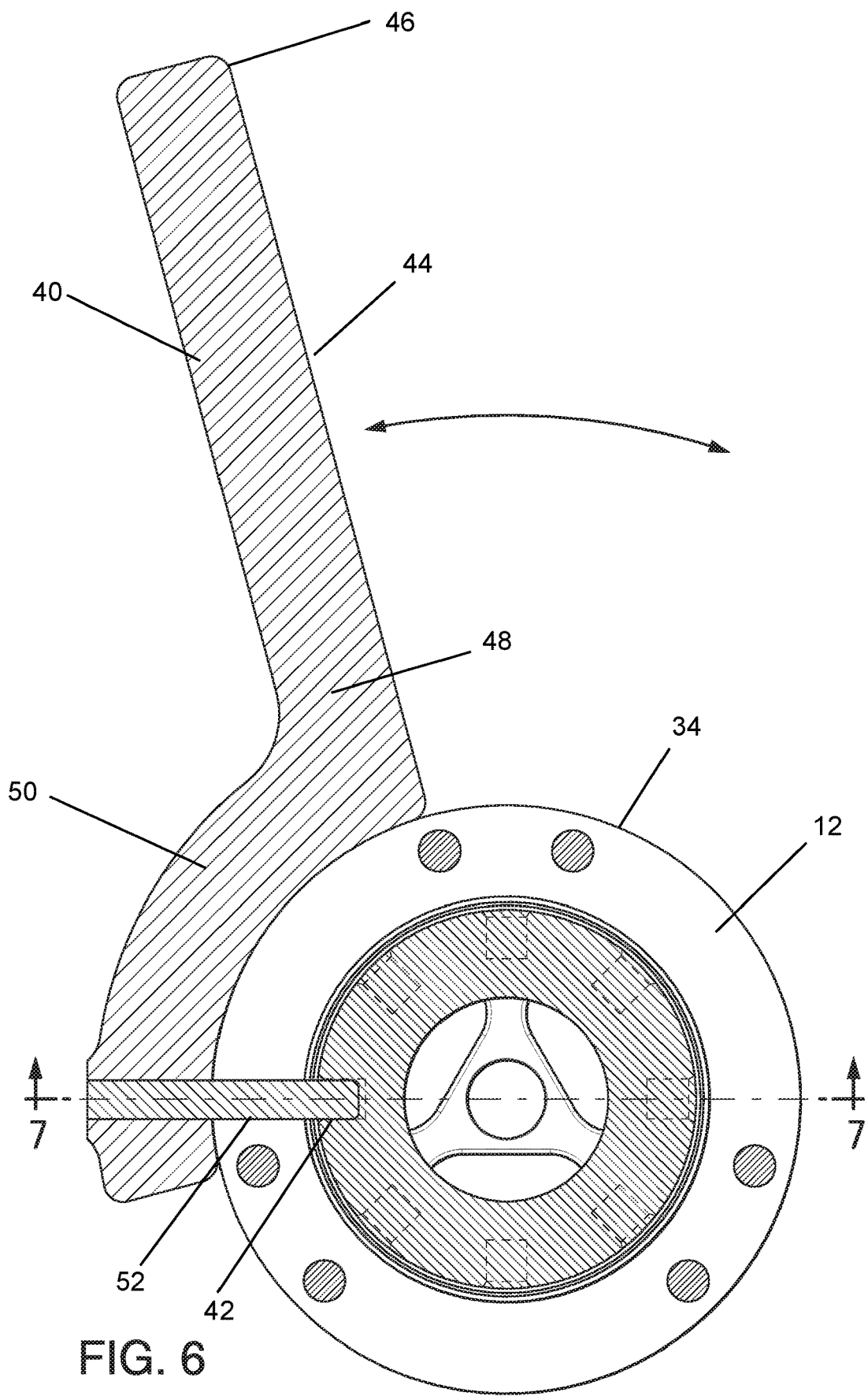
FIG. 6 is a cross-sectional view of the adjustment tool engaged with the valve assembly.
Figure 7:
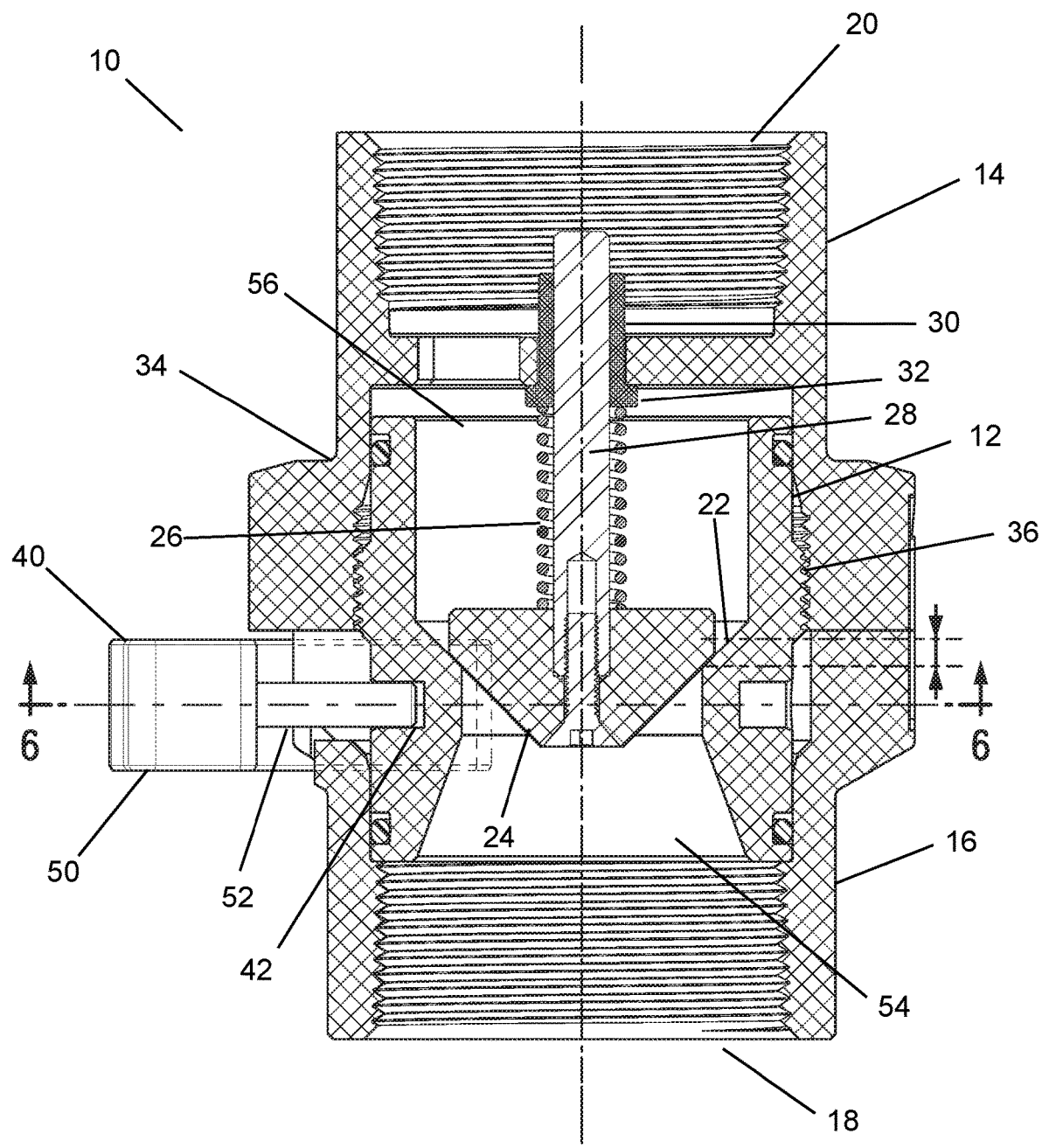
FIG. 7 is a cross-sectional view of the valve assembly while engaged with the adjustment tool.
Figure 8:
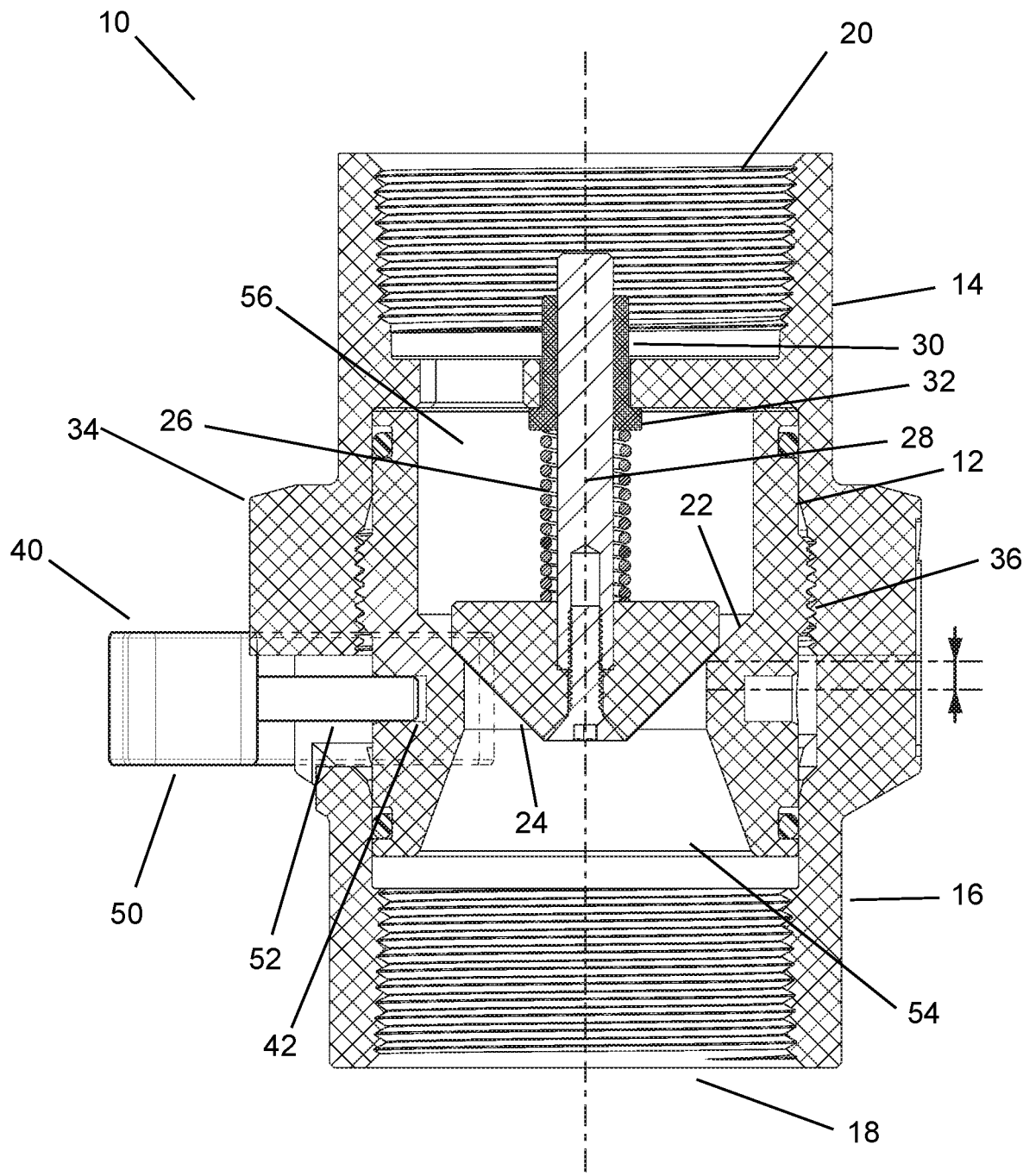
FIG. 8 is a cross-sectional view of the valve assembly and adjustment tool after the adjustment tool has been rotated around the central axis.

FIG. 5 is a perspective view of the assembly 10 and the adjustment tool 40. Adjustment tool 40 comprises a grip 44 having a proximal end 46 and distal end 48. Distal end 48 terminates with a curved prong 50 having an extension 52. Extension 52 is preferably cylindrical but may be rectangular or any other prismed shape which corresponds with adjustment bores 42. As seen in FIG. 6, the extension 52 can be inserted into an adjustment bore 42 and rotated. Further, as shown in FIGS. 7 and 8, once the adjustment tool 40 engages the adjustment bore, the valve housing 12 can be rotated, thereby either increasing or decreasing the tension on the spring 26 by raising or lowering the valve housing 12 which, in turn, increases or decreases the pressure needed to make the valve disc 24 repetitively open and close.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A valve assembly having an inlet and an outlet, the valve assembly adapted to increase the accuracy of an upstream water meter, the valve assembly comprising:
   a cylindrical valve housing nested within an upper housing and lower housing, the valve housing having a housing valve inlet and a housing valve outlet, a tapered valve seat positioned adjacent to the housing valve inlet, a plurality of adjustment bores, and a series of housing threads on an outside face of the valve housing;
   a valve disc positioned within the valve housing, the disc being tapered along its length, wherein the taper of the valve seat matches the taper of the valve disc, the valve disc having a seated orientation wherein it is in contact with the valve seat and an unseated orientation wherein the valve disc is spaced from the valve seat;
   a valve shaft having a forward end, a rearward end, and an intermediate extent therebetween, the valve shaft further comprising a retainer having a shoulder on the rearward end extending perpendicularly from a surface of the retainer and having an axial passage, the valve shaft slidably positioned within the axial passage;
   a coil spring positioned about the intermediate extent of the valve shaft, the coil spring having a first end in contact with the shoulder of the retainer, a second end of the coil spring contacting the valve disc, whereby the spring tension is varied depending upon the position of the housing threads which may be raised or lowered using an adjustment tool, the adjustment tool comprising a grip having a proximal and a distal end wherein the distal end terminates in a curved prong having an extension which protrudes from the curved prong;
   whereby water flowing from the housing valve inlet to the housing valve outlet of the valve assembly contacts the valve disc and further wherein a pre-determined water pressure is sufficient to unseat the valve disc and thereby compress air into the upstream water source thereby increasing the density of the water.

2. The valve assembly of claim 1 wherein the valve assembly is used in connection with a water meter.

3. The valve assembly of claim 1 wherein the valve housing is constructed from a self-lubricating polymer.

4. The valve assembly of claim 1 wherein the valve disc is constructed from a self-lubricating polymer.

5. The valve assembly of claim 1 wherein the extension of the adjustment tool is cylindrical.

6. The valve assembly of claim 1 wherein the extension of the adjustment tool comprises a prismed shape.

7. A water metering system for accurately measuring the volume of water used by an individual water consumer over a pre-determined amount of time, the system comprising:
   a water supply reservoir for storing a large volume of potable water to be distributed to a plurality of water consumers;
   a distribution network interconnected to the water supply reservoir, the distribution network interconnecting the plurality of water consumers, the distribution network having upstream and downstream ends;
   a water meter positioned upstream from the individual water consumer, the water meter operable to measure the volume of water used by the water consumer over a pre-determined period of time;
   a valve assembly comprising:
      a cylindrical valve housing nested within an upper housing and lower housing, the valve housing having a housing valve inlet and a housing valve outlet, a tapered valve seat positioned adjacent to the housing valve inlet, a plurality of adjustment bores, and a series of housing threads on an outside face of the valve housing;
      a valve disc positioned within the valve housing, the disc being tapered along its length, wherein the taper of the valve seat matches the taper of the valve disc, the valve disc having a seated orientation wherein it is in contact with the valve seat and an unseated orientation wherein the valve disc is spaced from the valve seat;
      a valve shaft having a forward end, a rearward end, and an intermediate extent therebetween, the valve shaft further comprising a retainer having a shoulder on the rearward end extending perpendicularly from a surface of the retainer and having an axial passage, the valve shaft slidably positioned within the axial passage;
      a coil spring positioned about the intermediate extent of the valve shaft, the coil spring having a first end in contact with the shoulder of the retainer, a second end of the coil spring contacting the valve disc, whereby the spring tension is varied depending upon the position of the housing threads which may be raised or lowered using an adjustment tool, the adjustment tool comprising a grip having a proximal and a distal end wherein the distal end terminates in a curved prong having an extension which protrudes from the curved prong;
      whereby water flowing from the housing valve inlet to the housing valve outlet of the valve assembly contacts the valve disc and further wherein a pre-determined water pressure is sufficient to unseat the valve disc and thereby compress air into the upstream water source thereby increasing the density of the water.

8. A water metering system for accurately measuring the volume of water used by an individual water consumer over a pre-determined amount of time, the system comprising:
   a water supply reservoir for storing a large volume of potable water to be distributed to a plurality of water consumers;
   a distribution network interconnected to the water supply reservoir, the distribution network interconnecting the plurality of water consumers, the distribution network having upstream and downstream ends;
   a water meter positioned upstream from the individual water consumer, the water meter operable to measure the volume of water used by the water consumer over a pre-determined period of time;
   a valve assembly including an inner housing that is threadably positioned within an outer housing, the inner housing including a disc and a spring, the spring having a tension for biasing the disc into a closed positioned within the inner housing, a plurality of adjustment bores positioned within the inner housing and being accessible through the outer housing, an adjustment tool for engaging one of the plurality of adjustment bores from outside of the outer housing, whereby the position of the inner housing with respect to the outer housing can be selectively adjusted to thereby change the tension of the spring.

* * * * *